United States Patent [19]

Cisler

[11] 4,080,080

[45] Mar. 21, 1978

[54] ADJUSTABLE LEG ASSEMBLY

[75] Inventor: Earl J. Cisler, Two Rivers, Wis.

[73] Assignee: American Hospital Supply Corporation, Evanston, Ill.

[21] Appl. No.: 769,050

[22] Filed: Feb. 16, 1977

[51] Int. Cl.² .............................................. F16B 7/14
[52] U.S. Cl. .................................. 403/108; 403/110; 403/378; 248/188.5, 248/411
[58] Field of Search ............... 403/109, 110, 106, 107, 403/108, 104, 377, 378; 248/188.5, 337, 354 C, 408, 409, 411, 412, 413, 414

[56] References Cited

U.S. PATENT DOCUMENTS

| 2,542,967 | 2/1951 | Waechter | 248/188.5 |
|---|---|---|---|
| 2,784,445 | 3/1957 | Greig et al. | 403/110 X |
| 2,817,548 | 12/1957 | Uthemann | 403/104 |
| 2,909,253 | 10/1959 | Hinze | 403/106 |
| 3,104,626 | 9/1963 | Brunette | 403/107 X |
| 3,222,095 | 12/1965 | Gerus | 403/104 |
| 3,604,734 | 9/1971 | Friedman | 403/104 |
| 3,871,780 | 11/1973 | Svensson | 403/104 |

FOREIGN PATENT DOCUMENTS

| 1,296,338 | 5/1962 | France | 248/354 C |
|---|---|---|---|
| 1,329,331 | 9/1973 | United Kingdom | 403/104 |

Primary Examiner—Wayne L. Shedd
Attorney, Agent, or Firm—Tilton, Fallon, Lungmus & Chestnut

[57] ABSTRACT

An adjustable leg assembly for use in any leg supporting application advantageously utilizing leg adjustability. The assembly includes a channel member, a telescoping member and a resilient spacer member. The resilient spacer member is fixed to the telescoping member and slidably mounted on the channel member. The telescoping member normally extends from one end of the channel member and can include a positive locking member engageable with the channel member at selected positions of adjustment. The resilient spacer member guides relative sliding movement while preventing direct contact between the channel and telescoping members. The assembly includes a pressure plate to urge the resilient spacer member into firm engagement with the channel member at selected times to frictionally secure the channel member to the telescoping member.

15 Claims, 5 Drawing Figures

U.S. Patent      March 21, 1978      4,080,080
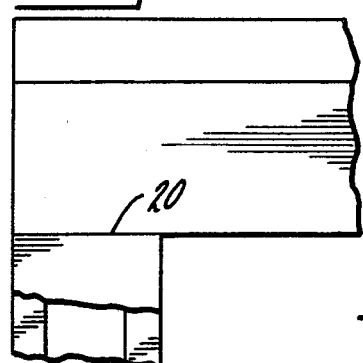
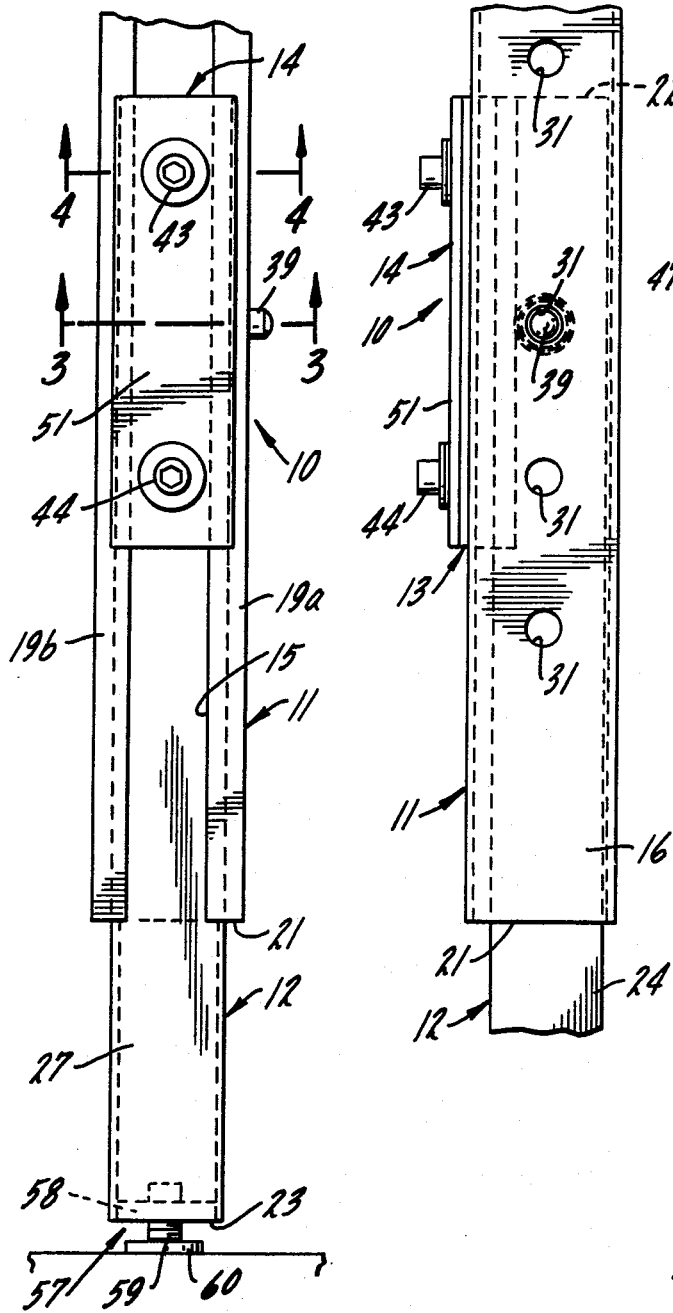
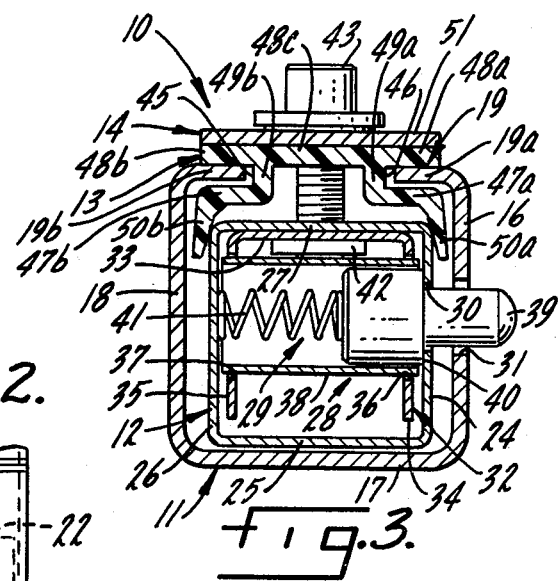
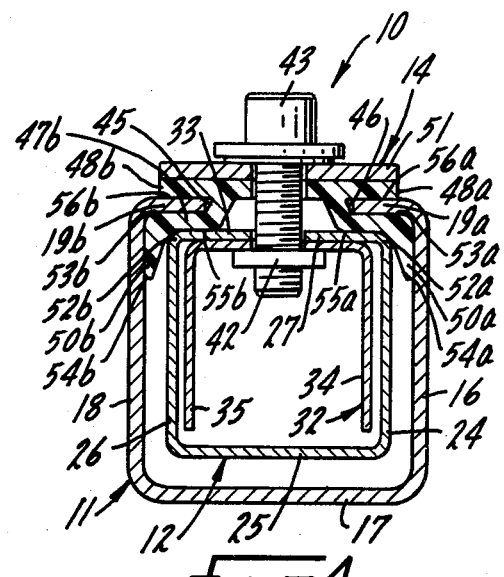
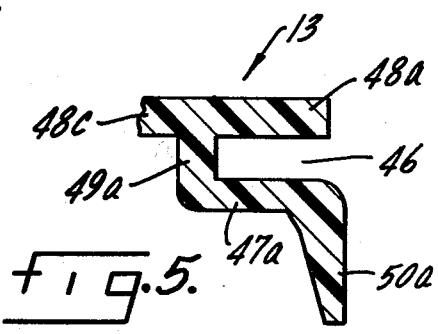

ADJUSTABLE LEG ASSEMBLY

BACKGROUND

The present invention relates to an adjustable leg assembly and more particularly to an adjustable leg assembly utilizing a resilient spacer member to guide relative sliding movement while preventing direct contact between a channel member and a telescoping member.

As is known in the art, tables, shelves, frames and other leg supported equipment are commonly provided with adjustable leg assemblies and, in most instances, the assemblies utilized with such equipment are capable of a variety of adjustments so as to make the equipment as a whole more functional. It is well known, however, that difficulties in guiding relative sliding movement between the members that make up the assemblies while at the same time preventing direct contact between the members to avoid marring their surface finishes may tend to reduce the desirability of the equipment. It is equally well-known that difficulties encountered in locking the members that make up the assemblies into selected positions of adjustment and later releasing the members for further adjustment may also tend to reduce the desirability of the equipment. In many instances, especially where the equipment is relatively large or heavy, the limitations on relative sliding movement, adjustability and locking heretofore known in the art may actually present greater problems than warranted based upon the expected benefits to be derived from use of an adjustable leg assembly.

The prior art is exemplified by U.S. Pat. Nos. 2,531,778; 2,639,789; 3,478,993; and 3,724,885. These references all reveal constructions in which rigid locking members are utilized in combination with the members or locking is achieved utilizing eccentricity and rotatability. The present invention represents an improvement upon such prior art constructions by providing a unique resilient spacer member capable of performing multiple functions.

SUMMARY

An adjustable leg assembly is provided having a channel member, a telescoping member, and a resilient spacer member. The resilient spacer member is fixed to the telescoping member and slidably mounted on the channel member with the telescoping member normally extending from one end of the channel member and the resilient spacer member guiding relative sliding movement while at the same time preventing direct contact between the channel and telescoping members. Means is provided for urging the resilient spacer member into firm engagement with the channel member at selected positions of adjustment to frictionally secure the channel member to the telescoping member.

The channel member preferably has a generally C-shaped cross-section defined by a longitudinal slot in the channel member. The cross-section can advantageously be formed generally rectangular in shape with the longitudinal slot being provided in one side of the channel member, and the telescoping member will then have a generally rectangular cross-section as well that is slightly smaller than the cross-section of the channel member. The channel member is preferably a fixed leg portion with the telescoping member being an extendable leg portion slidably received in one end of the fixed leg portion.

The assembly preferably includes positive locking means operative only at longitudinally spaced positions. The positive locking means can advantageously be a spring detent normally extending through an aperture in the telescoping member when the telescoping member is locked to the channel member. The channel member will then include a plurality of longitudinally spaced apertures to receive the spring detent.

In the disclosed embodiment, the resilient spacer member includes a pair of slide channels to receive the portions of the channel member adjacent the longitudinal slot. The slide channels are formed by corresponding inner and outer flange portions joined by flange spacing means. The outer flange portions are joined by an intermediate flange segment to form a continuous outer flange, and the inner flange portions include depending flange segments at their outer ends which are normally substantially perpendicular to the inner flange portions. The depending flange segments are wedge shaped with their widest portions integral with the outer ends of the inner flange portions. Such inner flange portions and the wedge shaped flange segments are disposed between the telescoping member and the channel member.

The resilient spacer member is formed of a deformable plastic material capable of repeatedly recovering its size and shape. A pressure plate is provided for urging the resilient spacer member into firm engagement with the channel member at selected positions of adjustment to frictionally secure the channel member to the telescoping member. The pressure plate is releasably secured to the telescoping member in engagement with the outer flange portions of the resilient spacer member.

It is therefore an object of the present invention to provide an adjustable leg assembly having a unique resilient spacer member capable of guiding relative sliding movement while preventing direct contact between a channel member and a telescoping member as well as serving as a deformable locking member for frictionally securing the channel member to the telescoping member. The provision of the structure and the realization of the advantages to be derived therefrom constitute additional important objects of the present invention with still other objects of this invention to be appreciated from consideration of the details of construction and operation which are set forth in the accompanying specifications, claims and drawings.

DRAWINGS

The invention is described in conjunction with the accompanying drawings in which:

FIG. 1 is a front elevational view of an adjustable leg assembly in accordance with the present invention supporting a table top;

FIG. 2 is an end elevational view of the adjustable leg assembly of FIG. 1;

FIG. 3 is a sectional view of the adjustable leg assembly taken on the line 3—3 of FIG. 1;

FIG. 4 is a sectional view of the adjustable leg assembly taken on the line 4—4 of FIG. 1; and FIG. 5 is a partial sectional view of a resilient spacer member of the adjustable leg assembly of FIG. 1.

DESCRIPTION

In the illustration given and with reference first to FIG. 1, the numeral 10 designates generally an adjustable leg assembly in accordance with the present invention supporting a table top (partially shown). The assembly 10 includes a channel member 11, a telescoping member 12, and resilient spacer member 13. The resilient spacer member 13 (as best shown in FIGS. 3 and 4) is fixed to the telescoping member 12 and slidably mounted on the channel member 11 to guide relative sliding movement while preventing direct contact between the channel member 11 and telescoping member 12. The telescoping member 12 normally extends from one end of the channel member 11 a distance determined by the selected position of adjustment of the assembly 10. The assembly 10 further includes means 14 for urging the resilient spacer member 13 into firm engagement with the channel member 11 at selected positions of adjustment to frictionally secure the channel member 11 to the telescoping member 12.

The channel member 11 has a generally C-shaped cross-section (as shown in FIGS. 3 and 4) defined by a longitudinal slot 15 in the channel member 11 (as shown in FIG. 1). The cross-section of the channel member 11 is generally rectangular having continuous side portions 16, 17, and 18 and interrupted side portion 19 with the longitudinal slot 15 defining the interruption of the side portion 19. The channel member 11 is a fixed leg portion, i.e., it is fixed relative to the equipment to be supported, having ends 20 and 21 and the telescoping member 12 is an extending leg portion, i.e., it is extendable relative to the equipment to be supported, having ends 22 and 23 with the end 22 of the extendable leg portion being slidably received in the end 21 of the fixed leg portion. The telescoping member 12 also has a generally rectangular cross-section having continuous side portions 24, 25, 26 and 27 with the side portions defining an enclosed hollow channel. The rectangular cross-section of the telescoping member 12 is slightly smaller than the rectangular cross-section of the channel member 11 (as shown in FIGS. 2 and 4) to facilitate relative sliding movement between the channel member 11 and the telescoping member 12 (as shown in FIG. 1).

The assembly 10 is further characterized by positive locking means 28 (as shown in FIG. 3) which is operative only at longitudinally spaced positions. The positive locking means 28 is a spring detent 29 which normally extends through an aperture 30 in the side 24 of the telescoping member 12 when the telescoping member 12 is locked in the channel member 11. The channel member 11 includes a plurality of corresponding longitudinally spaced apertures 31 (as shown in FIG. 2) located along the side 16 to receive the spring detent 29.

In one form of the invention, an inner channel 32 is provided within the telescoping member 12. The inner channel 32 has a generally U-shaped cross-section having sides 33, 34 and 35 with the sides 34 and 35 having suitable corresponding apertures 36 and 37 intermediate their lengths (as shown in FIG. 3) joined by a tubular guide 38 which can either be loosely held therein or secured thereto by any suitable means such as welding. The tubular guide 38 is open at both ends to receive the spring detent 29.

The spring detent 29 includes a generally cylindrical bullet catch 39 having an offset or shoulder 40. The major diameter of the bullet catch 39 is slightly smaller than the diameter of the tubular guide 38 with its minor diameter being smaller than the aperture 30 in the telescoping member 12 and the apertures 31 in the channel member 11. The spring detent 29 further includes a helical coil spring 41 also having a diameter smaller than the diameter of the tubular guide 38.

The inner channel 32 is further characterized by at least one weld nut 42 (as shown in FIG. 4) on the inner surface of the side 33 of the inner channel 32. The side 27 of the telescoping member 12 is suitably apertured and the side 33 of the inner channel 32 and the weld nut 42 (and preferably an additional weld nut not shown) are continuously threadedly apertured in alignment with the apertures in the side 27 to mate with suitable screws 43 and 44 which can advantageously be selected as either thumb screws or Allen screws. The screws 43 and 44 and the weld nuts such as 42 form a portion of the operative elements of the means 14 for urging the resilient spacer member 13 into firm engagement with the channel member 11.

The resilient spacer member 13 includes a pair of slide channels 45 and 46 (as shown in FIGS. 3 and 5) to receive corresponding side portions 19a and 19b of the side 19 of the channel member 11 adjacent the longitudinal slot 15. The slide channels 45 and 46 are formed by corresponding oppositely directed inner and outer flange portions 47a, 47b and 48a, 48b joined by flange spacing means which can suitably be a pair of spaced web portions 49a, 49b. The outer flange portions 48a, 48b are joined across web portions 49a, 49b by an intermediate flange segment 48c to form a continuous outer flange.

The inner flange portions 47a, 47b include corresponding depending flange segments 50a, 50b at their outer ends. The depending flange segments 50a, 50b are normally substantially perpendicular to the inner flange portions 47a, 47b advantageously being generally wedge shaped. The wedges of the depending flange segments are slightly more pronounced near the point where they are joined to the inner flange portions 47a, 47b.

A pressure plate 51 is the principal operative element of the means 14 for urging the resilient spacer member 13 into firm engagement with the channel member 11. The screws 43 and 44 releasably secure the pressure plate 51 to the weld nuts such as 42 attached to the surface of the side 33 of the inner channel 32. The pressure plate 51 can thus be urged into firm engagement with the outer flange portions 48a, 48b, 48c of the resilient spacer member 13.

The adjustable leg assembly 10 can be rendered operative in the following fashion. The helical coil spring 41 is first inserted into the tubular guide 38 in the inner channel 32. The bullet catch 39 is then likewise inserted into the tubular guide 38 with the large end thereof in abutting relationship with the helical coil spring 41. The spring 41 and the bullet catch 39 are then pressed together until the two elements are completely confined within the tubular guide 38. The inner channel 32 is next inserted into the telescoping member 12 with the side 33 of the inner channel 32 in engagement with the side 27 of the telescoping member 12 until the small end of the bullet catch 39 aligns with the aperture 30 in the side 24 of the telescoping member 12. The small end of the bullet catch 39 will then be urged through the aperture 30 by the helical coil spring 41 as far as the offset or shoulder 40 which will cooperate with the inner surface of the side 24 of the telescoping member 12 immediately surrounding the aperture 30 to retain the bullet catch 39 within the hollow channel. When the inner channel 32 has been so positioned, the threaded apertures extending through the side 33 of the inner channel 32 and the weld nuts such as 42 will align with the corresponding apertures in the side 27 of the telescoping member 12.

The resilient spacer member 13 can then be loosely fixed to the side 27 of the telescoping member 12. The depending flange segments 50a, 50b are positioned to straddle and contact the sides 24 and 26 of the telescoping member 12 and suitable apertures through the intermediate flange segment 48c of the resilient spacer member 13 between the web portions 49a, 49b are aligned with the corresponding apertures in the side 27 of the telescoping member 12 as well as the threaded apertures extending through the side 33 of the inner channel 32 and the weld nuts such as 42. The pressure plate 51 is then placed on the outer flange portions 48a, 48b and the intermediate flange segment 48c and suitable apertures through the pressure plate 51 are similarly aligned with the apertures through the intermediate flange segment 48c of the resilient spacer member 13 between the web portions 49 and 50, the corresponding apertures in the side 27 of the telescoping member 12, as well as the threaded apertures extending through the side 33 of the inner channel 32 and the weld nuts such as 42. The screws 43 and 44 are then inserted through the apertures and threadedly engaged with the weld nuts such as 42 to secure the inner channel 32, the telescoping member 12, the resilient spacer member 13, and the pressure plate 51 in loosely assembled relationship.

When the elements have been so assembled, the end 22 of the telescoping member 12 (or extendable leg portion) can be slidably inserted into the end 21 of the channel member 11 (or fixed leg portion). The slide channels 45 and 46 slidably cooperate with the side portions 19a and 19b adjacent the longitudinal slot 15 to guide relative sliding movement between the channel member 11 and the telescoping member 12. The screws 43 and 44 are still relatively loose during this operation so that the pressure plate 51 will not be exerting much if any lateral force against the resilient spacer member 13. The channel member 11 will, of course, readily receive the telescoping member 12 until the bullet catch 39 engages the end 21 of the channel member 11.

After the bullet catch 39 has engaged the end 21 of the channel member 11, it can be depressed so as to be confined within the channel member 11 to facilitate further insertion of the telescoping member 12. The side 16 of the channel member 11 will retain the bullet catch 39 in this position as the telescoping member is slidably moved further into the channel member 11 until the bullet catch 39 aligns with one of the plurality of longitudinally spaced apertures 31 in the channel member 11. The apertures 31 are so positioned laterally that they will align with the bullet catch 39 and the catch 39 will, of course, be urged through the lowermost one of the apertures 31 by the spring 41 as soon as the telescoping member 12 has been inserted sufficiently far into the channel member 11 to cause the alignment of the aperture 31 and the bullet catch 39. As can be seen from the drawings, the inner flange portions 47a, 47b and depending flange segments 50a, 50b generally conform to the inner surfaces of the side portions 19a and 19b and the side portions 16 and 18 of the channel member 11 to separate respective side portions 16, 18 and 19 from respective side portions 24, 26 and 27 with screws 43 and 44 retaining the telescoping member 12 in a suitable lateral position within the channel member 11 to also prevent contact between respective side portions 17 and 25.

Assuming that the adjustable leg assembly 10 is in a suitable position with the bullet catch 39 extending through the lowermost aperture 31, the pressure plate 51 can be urged inwardly by threadedly tightening the screws 43 and 44. The pressure plate 51 will cause the resilient spacer member 13 to be urged into firm engagement with the channel member 11 to frictionally secure the channel member 11 to the telescoping member 12. This is accomplished by the unique configuration of the deformable resilient spacer member 13 and the cooperation of the other elements therewith. The screws 43 and 44 upon being threadedly tightened draw the side 27 of the telescoping member 12 toward the side 19 of the channel member 11. The corners 52a, 52b defined by the junction of sides 24, 27 and sides 26, 27 of the telescoping member 12 are thus drawn into engagement with the wedge-shaped depending flange segments 50a, 50b and, more particularly, in engagement with the slightly pronounced wedge portions near the point where the dependent flange segments 50a, 50b are joined to the inner flange portions 47a, 47b. The wedging action of the corners 52a, 52b against the flange segments 50a, 50b causes the resilient spacer member 13 to be slightly deformed (as shown in FIG. 4). The deformation of the resilient spacer member 13 causes the inner flange portions 47a, 47b to be forced into tight engagement with the inner surfaces of the side portions 19a and 19b as at 53a, 53b and further causes the depending flange segments 50a, 50b to be forced into tight engagement with the inner surfaces of the side portions 16 and 18 of the channel member 11 as at 54a, 54b. Of course, the inner flange portions 47a, 47b and the outer flange portions 48a, 48b will also be forced into firm engagement respectively with the outer surfaces of the side portion 27 of the telescoping member 12 as at 55a, 55b and the outer surfaces of the side portions 19a and 19b as at 56a, 56b. As a result of the deformation caused by the wedging action, the resilient spacer member 13 can be forced into engagement with the channel member 11 and the telescoping member 12 at eight distinct points or surfaces to assure frictional securement of the channel member 11 to the telescoping member 12.

When it is desired to again adjust the leg assembly 10, the screws 43 and 44 are loosened to release the wedging action with the resilient spacer member 13 substantially recovering its original size and shape (as shown in FIG. 3). The bullet catch 39 can then be depressed and the telescoping member 12 can be slidably moved along the channel member 11 with the resilient spacer member 13 serving as a guide until the bullet catch 39 aligns with the next of the longitudinally spaced apertures 31 in the channel member 11 at which point the spring 41 will urge the bullet catch 39 through the next aperture 31 in the channel member 11. The bullet catch 39 can then again be depressed and the telescoping member 12 can again be slidably moved along the channel member 11 with the resilient spacer member 13 serving as a guide until the bullet catch 39 aligns with the next of the longitudinally spaced apertures 31 in the channel member 11 at which point the spring 41 will then still again urge the bullet catch 39 through the next aperture in the channel member 11. The bullet catch 39 will extend through the suitable aperture 31 in the channel member 11 after the adjustment has been made to aid in retaining the channel member 11 and telescoping member 12 in the desired assembled relationship. After the bullet catch 39 has been suitably adjusted, the screws 43 and 44 are again threadedly tightened to urge the pressure plate 51 firmly against the resilient spacer member 13 once again causing the tight wedging action between the channel member 11, telescoping member 12, and resilient spacer 12 so that the resilient spacer member 13 will be deformed in a manner frictionally securing the channel member 11 to the telescoping member 12.

An additional feature of the present invention is an adjustable leveler 57 provided at the end 23 of the telescoping member 12. The adjustable leveler 57 includes a cap plug 58 which is threadedly apertured to receive a leveler leg 59 having a threaded shank with a flat leg support pad 60 secured to its lower end. The adjustable leveler 57 permits correction of minor deviations in the floor surface when utilizing the adjustable leg assembly 10.

While the adjustable leg assembly 10 has been shown supporting a table top, the assembly can also be used for various other purposes. It can be used as an adjustable hanger assembly for wall cases or wall mounted cantilever style tables. It can be used as a height adjustment assembly for vertical stanchion members tied to a base table. It can be used as an adjustable mount assembly for tying or joining tables or vertical members to one another for independent adjustability. With these features, the adjustable leg assembly 10 is clearly characterized by its wide ranging versatility.

The pesent invention provides a rigid yet readily adjustable leg assembly adapted for a variety of purposes. The adjustable leg assembly can suitably be utilized for tables, shelves, frames, and other equipment requiring or advantageously utilizing adjustable legs for support. The tight locking principle of the resilient spacer member caused by the wedging and deformation of the member provides a highly advantageous means for frictionally securing a channel member to a telescoping member. The means for frictionally securing the members takes up the space between the channel member and the telescoping member in three directions to provide a rigid, secure leg. The positive locking means in the form of a spring detent results in a height indexing function together with a secondary locking action giving still further advantages in the adjustable leg assembly.

The present invention provides an adjustable leg assembly which is readily adjustable using ordinary tools. The assembly is completely rigid resulting in a stable working structure even for heavy duty applications. A wide range of tolerance between the channel member and the telescoping member can be accommodated resulting in less demanding and costly manufacturing procedures. The assembly cannot bind and the resilient spacer member assures that the painted finish of the channel member and the telescoping member will not be marred. The unique combination of the resilient spacer member, positive locking means, and adjustable leveler provide the distinct advantage of infinite height adjustment.

The adjustable leg assembly of the present invention therefore accomplishes the objective of using a resilient spacer member capable of performing multiple functions. The spacer member serves as a bearing member to guide relative sliding movement between a channel member and a telescoping member into selected positions of adjustment. The spacer member also serves to prevent direct contact between the channel member and the telescoping member to avoid marring the surface finish of those elements. The spacer member further provides means for frictionally securing the channel member to the telescoping member. The present invention therefore provides structure to accomplish all of the objectives heretofore known to be desirable but not accomplished by any prior adjustable leg assembly.

While in the foregoing specifications a detailed description of the invention has been set forth for the purpose of illustration, variations of the details herein given may be made by those skilled in the art without departing from the spirit and scope of the invention.

I claim:

1. An adjustable leg assembly comprising a channel member, a telescoping member normally extending from one end of said channel member, a resilient spacer member fixed to said telescoping member and slidably mounted on said channel member, said resilient spacer member guiding relative sliding movement while preventing direct contact between said channel and telescoping members, and means for urging said resilient spacer member into firm engagement with said channel member at selected positions of adjustment to frictionally secure said channel member to said telescoping member.

2. The assembly of claim 1 in which said channel member has a generally C-shaped cross-section defined by a longitudinal slot in said channel member.

3. The assembly of claim 2 in which said cross-section is generally rectangular and said longitudinal slot is provided along one side of said channel member.

4. The assembly of claim 3 in which said telescoping member has a generally rectangular cross-section and said cross-section is slightly smaller than the cross-section of said channel member.

5. The assembly of claim 1 in which said channel member is a fixed leg portion and said telescoping member is an extendible leg portion and said extendible leg portion is slidably received in one end of said fixed leg portion.

6. The assembly of claim 1 including positive locking means operative only at longitudinally spaced positions.

7. The assembly of claim 6 in which said positive locking means is a spring detent normally extending through an aperture in said telescoping member and said channel member includes a plurality of longitudinally spaced apertures to receive said spring detent.

8. The assembly of claim 4 in which said resilient spacer member includes a pair of slide channels to receive the portions of said channel member adjacent said longitudinal slot.

9. The assembly of claim 8 in which said slide channels are formed by corresponding pairs of inner and outer flange portions joined by flange spacing means.

10. The assembly of claim 9 in which said outer flange portions are joined by an intermediate flange segment to form a continuous outer flange.

11. The assembly of claim 9 in which said inner flange portions include depending flange segments at their outer ends, said depending flange segments normally being substantially perpendicular to said inner flange portions.

12. The assembly of claim 11 in which said depending flange segments are generally wedge shaped, said wedge shaped flange segments and said inner flange portions being disposed between said telescoping member and said channel member.

13. The assembly of claim 1 in which said resilient spacer member is formed of a deformable plastic material capable of repeatedly recovering its size and shape.

14. The assembly of claim 9 in which said means for urging said resilient member into firm engagement with said channel member includes a pressure plate.

15. The assembly of claim 14 in which said pressure plate is releasably secured to said telescoping member in engagement with said outer flange portions of said resilient spacer member.

* * * * *